United States Patent Office 2,836,256
Patented May 27, 1958

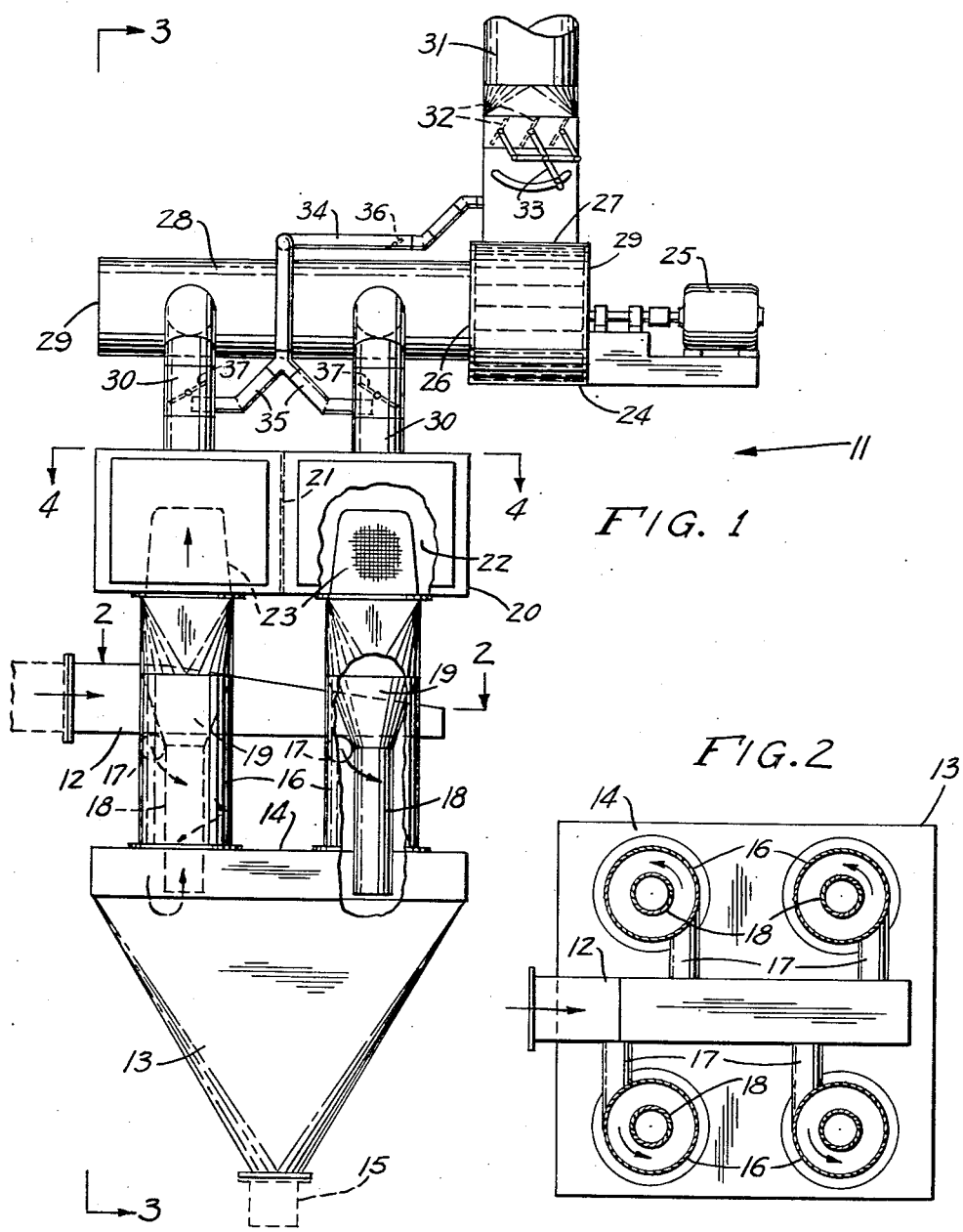

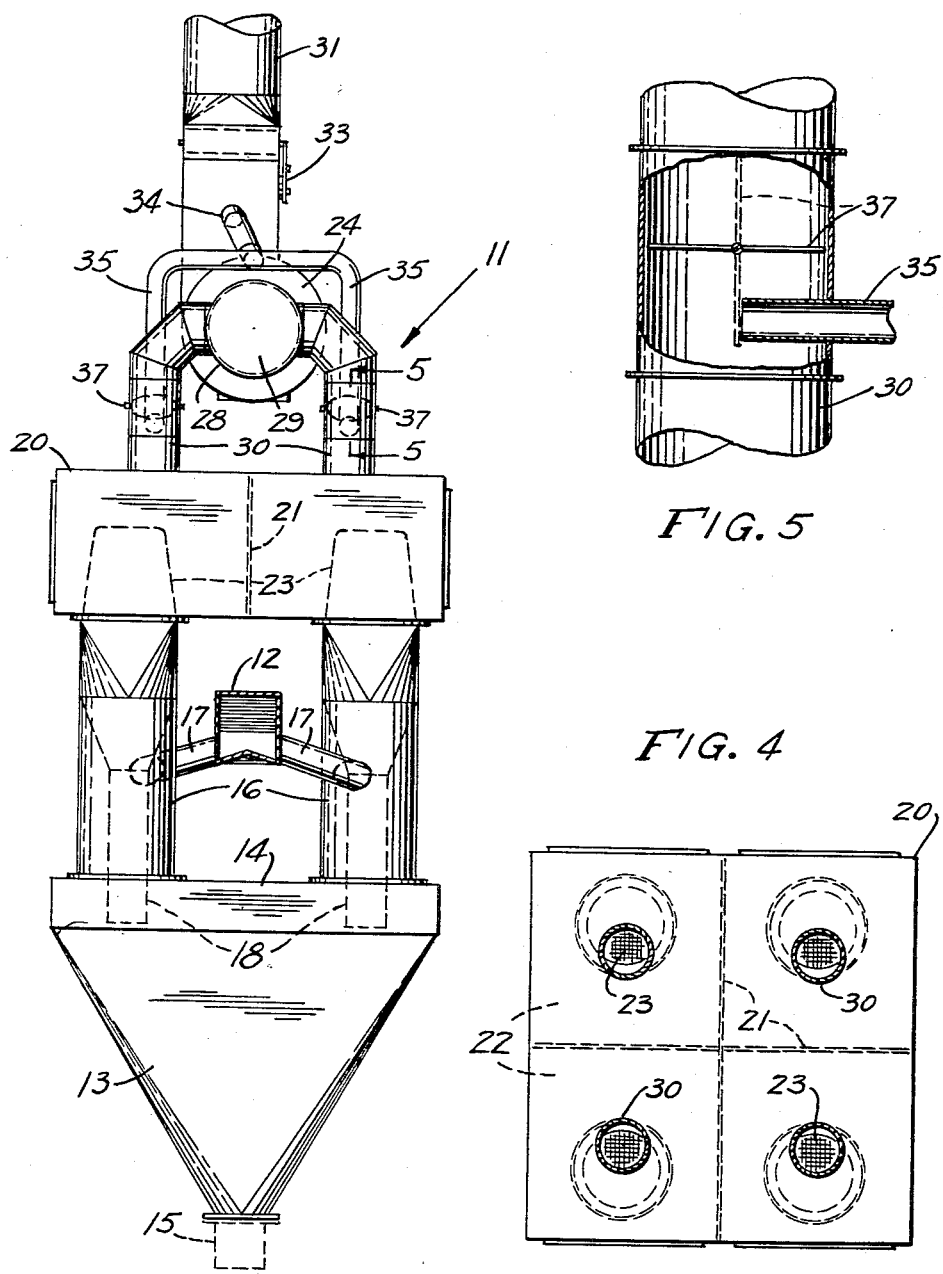

2,836,256

DUST COLLECTOR

Eddie K. Caskey, Satanta, Kans.

Application November 22, 1955, Serial No. 548,359

3 Claims. (Cl. 183—34)

This invention relates to dust collection systems, and more particularly to a dust collection system for separating solids from gases and being provided with means for cleaning the filter elements thereof without removing said filter elements from the system.

A main object of the invention is to provide a novel and improved dust collection system for separating solids from the atmosphere or from other gases, said system involving relatively simple components, being easy to install, and being provided with means for cleaning the filter elements thereof without removing said filter elements from the system.

A further object of the invention is to provide an improved dust collection system which is inexpensive to construct, which is dependable in operation, and which requires a minimum amount of repair or maintenance.

Further objects and advantages of the invention will become apparent from the following description and claims, and from the accompanying drawings, wherein:

Figure 1 is an elevational view of an improved dust collection system constructed in accordance with the present invention.

Figure 2 is a horizontal cross sectional view taken on the line 2—2 of Figure 1.

Figure 3 is a vertical transverse cross sectional view taken on the line 3—3 of Figure 1.

Figure 4 is a horizontal cross sectional view taken on the line 4—4 of Figure 1.

Figure 5 is an enlarged cross sectional detail view taken on the line 5—5 of Figure 3.

Referring to the drawings, the improved dust collection system is designated generally at 11. Said system comprises an intake conduit 12 through which the dust-laden gas or air enters the system. The conduit 12 extends over a downwardly tapering dust collection chamber 13 having a top wall 14 and being connected at its bottom end to a discharge spout 15 by means of which dust collected in the chamber 13 may be emptied into a suitable receptacle.

Connected to the top wall 14 of chamber 13 is a plurality of vertical ducts 16, for example four ducts, two of the ducts being located on one side of the conduit 12 and the remaining two ducts being located on the other side of said conduit 12, said ducts being connected to the respective opposite sides of conduit 12 by respective horizontal conduits 17 spaced longitudinally along conduit 12 and being tangentially connected to the respective ducts 16, as shown in Figure 2.

Designated at 18 are respective return ducts which are arranged concentrically within the vertical ducts 16 and which depend downwardly a substantial distance beyond the top wall 14 and into the dust collection chamber 13, as is clearly shown in Figure 1. The ducts 18 are substantially smaller in size than the ducts 16 but are provided with upwardly flaring top portions 19 which sealingly engage the inside surfaces of the ducts 16 above the points of connection of the conduits 17 to ducts 16, as is shown in Figure 1, thus sealing the ducts 16 above said conduits 17 so that the dust-laden gas or air from the ducts 17 can only flow in a downward direction around the depending return conduits 18. Because of the tangential connections of conduits 17 to the ducts 16, the dust-laden gas or air entering the ducts 16 through conduits 17 is given a cyclonic or whirling movement, which causes a substantial portion of the dust carried by the air or gas to settle downwardly into the collection chamber 13 by gravity.

Designated at 20 is a horizontal filter housing which is connected to the top ends of the ducts 16 and which is provided with the respective partition walls 21 dividing the housing into respective compartments 22, each of which communicates with the top portion of a duct 16. Disposed in the respective compartments 22 and secured over the top ends of the respective ducts 16 are respective porous filter bags 23, arranged to trap dust carried by the air or gas ascending through the return ducts 18 and through the top portions of ducts 16 into the respective housing chambers 22.

Designated at 24 is a vacuum blower which is driven by an electric motor 25, as shown in Figure 1, said blower comprising a conventional blower housing having an inlet port at a side wall thereof, for example at the side wall 26 thereof, and having an outlet port at its top wall, for example at the top wall 27, shown in Figure 1. Designated at 28 is an intake duct connected to the intake port in wall 26 and having a closed end wall 29. The intake duct 28 is connected to the top of each housing chamber 22 by a respective conduit 30 of substantial diameter. Connected to the outlet port in the top wall 27 of blower 28 is a discharge flue 31 provided with a plurality of linked internal louver elements 32 which are manually adjustable by means of an external operating lever 33, thus defining adjustable valve means in the flue 31 to regulate the flow through said flue.

Connected to the flue 31 between the flow-regulating valve elements 32 and the top wall 27 of the blower 24 is a relatively small recirculation duct 34 which merges with respective branch ducts 35 identical in size with the duct 34 and which are connected to and extend into the respective conduits 30. The recirculation duct 34 is provided with a manually adjustable valve 36, and the respective conduits 30 are provided with adjustable flap valves 37 located above the connections of the branch ducts 35 thereto, as is clearly shown in Figure 1.

As shown in Figure 5, the flap valves 37 are pivoted in the conduits 30 on axes spaced above and adjacent to the planes of the ends of the branch ducts 35 and are spaced above the branch ducts 35 so that the distance from their axes with respect to the branch ducts is substantially less than the radius of the flap valves, whereby the flap valves may be at times rotated to vertical positions substantially covering the ends of the branch ducts 35. Figure 5 illustrates such a position of the flap valve 37 in one of the conduits 30, in dotted view. At other times, the flap valves 37 may be adjusted to horizontal positions, closing off the conduits 30 from the blower intake duct 28 and connecting the lower portions of conduits 30 to the recirculation conduit 34.

In operation, the dust-laden gas or air is drawn through the inlet conduit 12 and is drawn tangentially into the lower portions of the vertical ducts 16, being given a cyclonic or whirling action, as above described, whereby a substantial portion of the dust in the air or gas settles downwardly into the collection chamber 13. The air or gas moves downwardly into the upper portion of chamber 13 and then is drawn upwardly through the return ducts 18, whereby additional dust or particles in the air or gas are removed because of the sharp change in direction of the air or gas as it is moved upwardly through the conduits 18. The air or gas then enters the upper portions of conduits 16 and passes through the porous filter bags 23 into the chambers 22, and thence upwardly through the conduits 30 and the blower intake conduit 28. The filtered gas passes through the blower and discharges from the system through the flue 31 at a rate of flow determined by the setting of the valve elements 32.

Obviously, as the filter elements 23 fill up with dust, they will tend to restrict the flow of gas or air through the system. Hence, a plurality of compartments 22 are provided, each one containing a filter element 23. At intervals one compartment is shut off from the blower intake conduit 28 by closing the flap valve 37 in the associated duct 30, namely, by moving said flap valve to a horizontal position, as shown in Figure 5. When this is done, air or gas recirculates through this duct 30 from the flue 31 through the recirculation conduit 34 and through the associated branch conduit 35. The recirculating air or gas flows downwardly into the associated chamber 22 and dumps the dust from the filter bag 23 therein by turning said filter bag inside out. The dust from the filter bag falls by gravity through the upper portion of the associated conduit 16 and the associated return conduit 18 into the collection chamber 13. Under these conditions the vacuum in the chamber 13 will be substantially normal, since the remaining three compartments 22 are still in operation, the vacuum provided by the blower 24 being sufficient to provide normal operation when one of the conduits 30 is cut off from the intake duct 28 of the blower while the other three conduits 30 remain in communication therewith.

Obviously, any desired number of compartments 22 may be employed, the blower being designed to provide the required vacuum in the compartments when one compartment is subjected to recirculation, as above described. This enables the filter bag in each compartment to be cleaned while the system is in operation, enabling the system to be operated continuously and allowing the filter bags to be cleaned without necessitating their removal from the system.

In relatively large systems, the respective compartments may be provided with a plurality of filter bags 23, instead of a single filter bag, said filter bags being in simultaneous operation and being simultaneously cleaned by the recirculation procedure above described.

A certain amount of air or gas will recirculate through the relatively small conduit 34 and the branch conduits 35 at all times, but since these conduits are relatively small, the normal recirculation of the air or gas will not substantially interfere with the operation of the system. Furthermore, as shown in Figure 5, when the damper valves 37 are opened, they substantially block the end of the branch conduits 35, further reducing the recirculation in the associated conduits 30.

Since the branch conduits 35 and the main recirculation conduit 34 are of the same diameter, most of the recirculation will take place through the conduit 30 whose damper valve 37 is closed, so that relatively little air of gas recirculates through the other conduits 30.

The louver valve elements 32 are employed not only for controlling the vacuum in the system but also for developing the pressure required in the portion of flue 31 therebelow to produce the desired recirculation through conduit 34 and the branch conduits 35. The flow of the recirculating gas or air through the conduit 34 may be further controlled by adjusting the valve 36 in recirculation conduit 34 to provide the desired amount of recirculating flow.

The louver valve operating lever 33 and the adjustable flap valves 37 are preferably automatically controlled by any suitable means; thus the lever 33 may be controlled by means responsive to rate of flow, so as to maintain a desired rate of flow, and the flap valves 37 may be regulated by suitable timing means arranged to actuate said flap valves at the desired intervals.

While a specific embodiment of an improved dust collection system has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A dust collection system comprising an intake conduit, a collection camber disposed below said intake conduit, said collection chamber having a top wall, a plurality of ducts connected between said intake conduit and said top wall and communicatively connecting said intake conduit and the top portion of said collection chamber, respective return ducts depending into said collection chamber and secured within said first-named ducts, said return ducts having their top ends located above the first-named ducts, respective filter chambers sealed from each other and communicatively connected to the top ends of said return ducts, respective flexible porous filter bags secured in said filter chambers over the top ends of said return ducts, a blower having an intake port and a discharge port, a discharge flue communicatively connected to the discharge port of said blower, flow-restricting means in said discharge flue, a blower intake duct communicatively connected to the intake port of said blower, respective conduits communicatively connecting said filter chambers to said intake duct, a relatively small recirculation duct communicatively connected to said discharge flue between said flow-restricting means and said blower discharge port, respective branch ducts substantially similar in size to said recirculation duct and communicatively connecting said recirculation duct to said last-named conduits, and respective independently controlled valves in said last-named conduits between the connections thereto of the branch ducts and the blower intake duct, whereby a reverse air flow will be developed in a selected filter chamber by closing the valve in the conduit communicatively connected to the selected filter chamber, whereby the filter bag in the selected chamber will be relieved of accumulated dust therein, and whereby said accumulated dust will be discharged into the collection chamber through the associated return duct.

2. A dust collection system comprising an intake conduit, a collection chamber disposed below said intake conduit, said collection chamber having a top wall, a plurality of ducts connected between said intake conduit and said top wall and communicatively connecting said intake conduit and the top portion of said collection chamber, respective return ducts depending into said collection chamber and secured within said first-named ducts, said return ducts having their top ends located above the first-named ducts, respective filter chambers sealed from each other and communicatively connected to the top ends of said return ducts, respective flexible porous filter bags secured in said filter chambers over the top ends of said return ducts, a blower having an intake port and a discharge port, a discharge flue communicatively connected to the discharge port of said blower, adjustable flow-restricting valve means in said discharge flue, a blower intake duct communicatively connected to the intake port of said blower, respective conduits communicatively connecting said filter chambers to said intake duct, a relatively small recirculation duct communicatively connected to said discharge flue between said flow-restricting valve means and said blower discharge port, respective branch ducts substantially similar in size to said recirculation duct and communicatively connecting said recirculation duct to said last-named conduits, and respective independently controlled valves in said last-named conduits between the connections thereto of the branch ducts and the blower intake duct, whereby a reverse air flow will be developed in a selected filter chamber by closing the valve in the conduit communicatively connected to the selected filter chamber, whereby the filter bag in the selected chamber will be relieved of accumulated dust therein, and whereby said accumulated dust will be discharged into the collection chamber through the associated return ducts.

3. A dust collection system comprising an intake conduit, a collection chamber disposed within said intake conduit, said collection chamber having a top wall, a plurality of ducts connected to said top wall, respective conduit means connected substantially tangentially to said first-named ducts and communicatively connecting said intake conduit to said first-named ducts, communicatively connecting said intake conduit and the top portion of said collection chamber, respective return ducts depending into said collection chambers and secured within said first-named ducts, said return conduits having enlarged top ends located above said first-named ducts, the remaining portions of said return ducts being substantially smaller than and being coaxial with said first-named ducts, respective filter chambers sealed from each other and communicatively connected to the top ends of said return ducts, respective flexible porous filter bags secured in said filter chambers over the top ends of said return ducts, a blower having an intake port and a discharge port, a discharge flue communicatively connected to the discharge port of said blower, adjustable flow-restricting valve means in said discharge flue, a blower intake duct communicatively connected to the intake port of said blower, respective conduits communicatively connecting said filter chambers to said intake duct, a relatively small recirculation duct communicatively connected to said discharge flue between said flow-restricting valve means and said blower discharge port, respective branch ducts substantially similar in size to said recirculation duct and communicatively connecting said recirculation ducts to said last-named conduit, and respective independently controlled valves in said last-named conduits between the connections thereto of the branch ducts and the blower intake duct, whereby a reverse air flow will be developed in a selected filter chamber by closing the valve in the conduit communicatively connected to the selected filter chamber, whereby the filter bag in the selected chamber will be relieved of accumulated dust therein, and whereby said accumulated dust will be discharged into the collection chamber through the associated return ducts.

References Cited in the file of this patent

UNITED STATES PATENTS

| | | |
|---|---|---|
| 1,458,720 | Malone | June 12, 1923 |
| 2,276,805 | Tolman | Mar. 17, 1942 |

FOREIGN PATENTS

| | | |
|---|---|---|
| 157,810 | Great Britain | Jan. 10, 1921 |
| 279,424 | Germany | Oct. 17, 1914 |
| 332,601 | Great Britain | July 30, 1930 |
| 610,391 | Germany | Mar. 9, 1935 |
| 880,715 | France | Jan. 6, 1943 |